(12) United States Patent
Bhesania et al.

(10) Patent No.: US 7,983,686 B2
(45) Date of Patent: Jul. 19, 2011

(54) DYNAMIC FREQUENCY INVENTORY AND MASKING

(75) Inventors: Firdosh K. Bhesania, Kirkland, WA (US); Randall E. Aull, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 11/263,381

(22) Filed: Oct. 31, 2005

(65) Prior Publication Data

US 2007/0099660 A1 May 3, 2007

(51) Int. Cl.
 *H04W 72/00* (2009.01)
(52) U.S. Cl. ........... 455/450; 455/67.11; 455/403; 455/420; 455/421; 455/422.1; 455/423; 455/426.1; 455/452.1; 455/454; 455/507; 455/509; 455/514; 455/517
(58) Field of Classification Search .......... 455/507, 455/509, 514, 517, 450, 454, 452, 452.1, 455/403, 422.1, 426.1
See application file for complete search history.

(56) References Cited

U.S. PATENT DOCUMENTS

| | | | |
|---|---|---|---|
| 5,862,480 A * | 1/1999 | Wild et al. | 455/432.2 |
| 6,069,871 A * | 5/2000 | Sharma et al. | 370/209 |
| 6,188,906 B1 | 2/2001 | Lim et al. | |
| 6,230,017 B1 * | 5/2001 | Andersson et al. | 455/456.6 |
| 6,256,477 B1 * | 7/2001 | Eidson et al. | 455/63.3 |
| 6,466,793 B1 | 10/2002 | Wallstedt et al. | |
| 6,732,163 B1 * | 5/2004 | Halasz | 709/220 |
| 7,260,620 B1 * | 8/2007 | Halasz | 709/220 |
| 7,599,686 B2 * | 10/2009 | Quinn et al. | 455/423 |
| 2003/0058277 A1 * | 3/2003 | Bowman-Amuah | 345/765 |
| 2004/0072578 A1 * | 4/2004 | Keutmann et al. | 455/456.1 |
| 2004/0157600 A1 * | 8/2004 | Stumpert et al. | 455/432.1 |
| 2004/0203667 A1 * | 10/2004 | Schroeder et al. | 455/414.1 |
| 2004/0223477 A1 * | 11/2004 | Iwasaki et al. | 370/338 |
| 2005/0124351 A1 * | 6/2005 | Black et al. | 455/452.2 |

FOREIGN PATENT DOCUMENTS

JP  06334597 A  12/1994

OTHER PUBLICATIONS

International Search Report dated Mar. 29, 2007 mailed Mar. 29, 2007 for PCT Application Serial No. PCT/US2006/042612, 3 Pages.
"Information Technology—Telecommunications and information exchange between systems—Local and Metropolitan area networks—Specific requirements, Part 11: Wireless LAN Medium Access Control (MAC) and Physical Layer (PHY) specifications", LAN MAN Standards Committee of the IEEE Computer Society, IEEE, Jun. 12, 2003.

* cited by examiner

*Primary Examiner* — Rafael Pérez-Gutiérez
*Assistant Examiner* — Liton Miah

(57) ABSTRACT

A centralized wireless resource manager is leveraged to facilitate in reconciling communication conflicts between wireless devices that interact with a computing device and/or reconciling communication conflicts between a wireless device and a locale of a computing device interacting with the wireless devices. One instance allows dynamic reconciliation of a wireless device based, at least in part, on the wireless device's hardware supported communication parameters and/or its currently utilized communication parameters and the like. Another instance provides dynamic communication adjustments based, at least in part, on a locale of a computing device. This facilitates in adjusting communication frequencies based on, at least in part, local laws and regulations and the like.

20 Claims, 9 Drawing Sheets

DYNAMIC FREQUENCY INVENTORY AND MASKING

BACKGROUND

Computers and computer-based devices have become a necessary tool for many applications throughout the world. Typewriters and slide rules have become obsolete in light of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many parts of the world.

As computing devices have continued to develop and their use have become more widespread, peripherals associated with such devices have also become commonplace. For instance, typical computing devices include a plurality of ports into which peripherals can be attached and utilized in connection with the aforementioned computing devices. More particularly, attachable peripherals can include printers, keyboards, portable music/video players and recorders, cameras, video cards, speaker systems, personal digital assistants (PDAs), portable telephones, or any other suitable computer peripheral. These devices can be physically coupled to a computing device by way of ports (e.g., card slots, USB ports, printer ports, etc.), or can be communicatively coupled over a wireless link (e.g., Bluetooth, WiFi/802.11, wireless USB, etc.). This interaction of peripherals with computing devices has rendered such computing devices even more valuable in terms of user efficiency.

Plug-and-play is one exemplary manner of configuring a computer peripheral to operate desirably with a computing device. Plug-and-play typically requires support in both a hardware device (e.g., a peripheral) coupled to a computing device and in software associated with such device. Hardware devices are typically associated with an identification number or sequence that uniquely identifies the type of hardware device. For instance, a sequence of bits, a name, a serial number, or the like can be employed to uniquely identify the type of hardware device. A computer bus driver then recognizes that a particular type of hardware device has been coupled to the computing device and transmits the device ID to a plug-and-play manager that locates a software driver for the device for installation. The appropriate device driver is then loaded into an operating system of the computing device to enable utilization of the hardware that is desirably being utilized.

Radio or wireless devices can impose additional issues with plug and play performance. Because these types of devices transmit and receive wireless signals, different devices (using the same or different wireless technologies) can often conflict with each other, causing communication interference issues with a common computing platform. The wireless devices can also conflict with regional laws and regulations that govern what frequencies can be employed by local governments or countries and the like. Thus, a particular wireless device can be legally operated in one region but still be illegal to operate in another. These conflict issues tend to limit the use of wireless devices and place additional burdens on users of the computing platforms to ensure that they are in compliance with local laws and also to resolve any wireless interference problems between different wireless devices plugged into their computers.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to wireless devices, and more particularly to systems and methods for enhancing compatibility of wireless devices with computing devices. A centralized wireless resource manager is leveraged to facilitate in reconciling communication conflicts between wireless devices that interact with a computing device and/or reconciling communication conflicts between a wireless device and a locale of a computing device interacting with the wireless devices. Thus, instances provide techniques that allow for plug and play of various wireless technology devices without requiring user interaction. One instance allows dynamic reconciliation of a wireless device based, at least in part, on the wireless device's hardware supported communication parameters and/or its currently utilized communication parameters and the like. In this manner, a plurality of wireless devices can, for example, be connected to a computing device without requiring a user to manually resolve wireless communication issues. Another instance provides dynamic communication adjustments based, at least in part, on the locale of a computing device. This facilitates in adjusting communication frequencies based on, at least in part, local laws and regulations and the like. Thus, instances facilitate in extending the usefulness of wireless devices (e.g., allowing the same device to be used legally in multiple countries, etc.) and/or in dynamically reconciling wireless devices that can employ potentially incompatible communication technologies.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
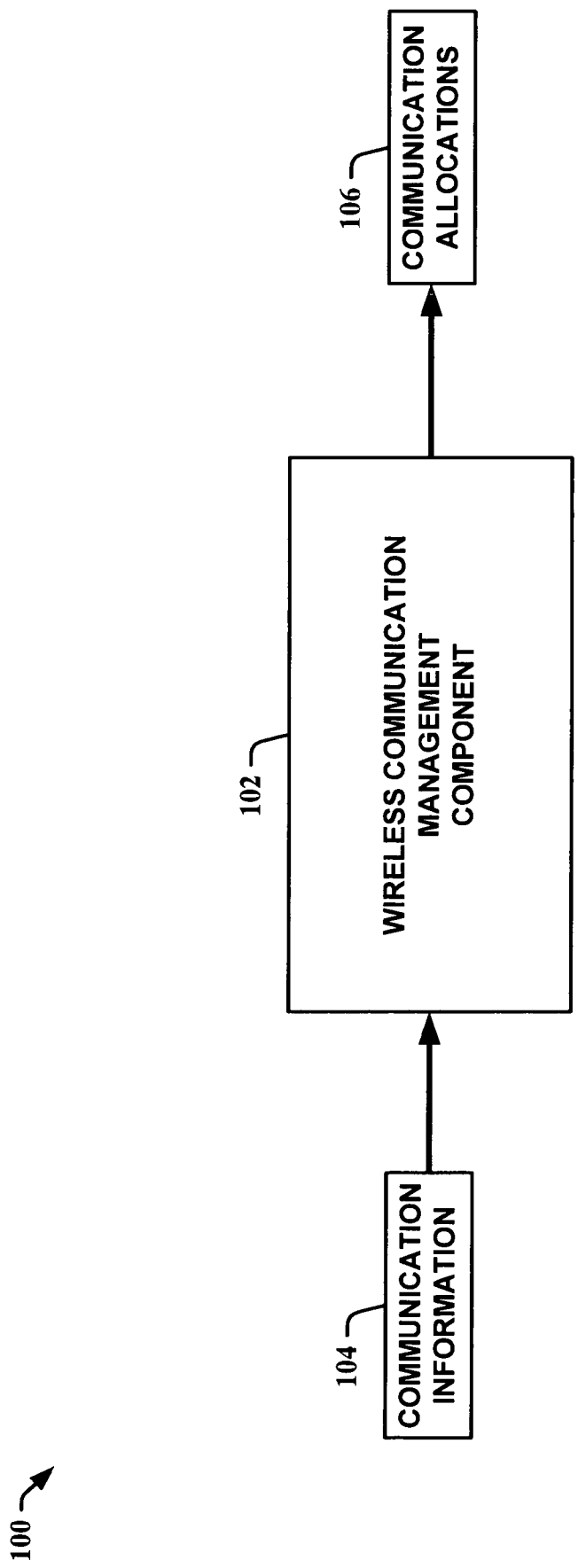
FIG. 1 is a block diagram of a wireless communication management system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

The systems and methods herein provide instances that can centrally manage wireless communications for a computing device. This allows software to control and/or modify operational characteristics of wireless communication device hardware. In one instance, for example, a centralized process is utilized to register a frequency spectrum that a wireless radio employs and/or to provide frequency masking information that can be applied to a radio on a system as a computing device moves from one geographic region to another. Other instances employ a centralized repository of frequency spectrum that a computing device can utilize to reconcile various wireless buses beyond the typical pre-defined commands that set frequency ranges (to be opened/blocked) for a given wireless communication standard. Thus, registration and/or masking can be provided for a wireless device to facilitate in providing interference free communications and/or legal/permitted communications for a given physical location. This substantially extends the usefulness of wireless devices without requiring different wireless hardware devices for different countries, etc., that can have different communication operating restrictions, greatly increasing the usefulness of wireless communication devices.

In FIG. 1, a block diagram of a wireless communication management system 100 in accordance with an aspect of an embodiment is shown. The wireless communication management system 100 is comprised of a wireless communication management component 102 that receives communication information 104 and provides communication allocations 106. The communication information 104 can include, but is not limited to, supported wireless properties and/or current wireless properties such as, for example, hardware frequency spectrum, operating frequency masks (firmware/software frequency spectrum, e.g., can be a subset of the hardware frequency spectrum due to geographic location (e.g., governmental transmission restrictions on wireless devices for a particular country, etc.)), current frequency masks (e.g., extended mask beyond the operating mask to exclude currently detected interference frequencies, etc.), power, range, band groups, channels, frequency usage type (e.g., frequency hopping, etc.) and/or interference properties and the like. Geographic location can also be part of the communication information 104 if a wireless device possesses this information (e.g., equipped with GPS, stationary wireless devices such as communication towers with operability with computing devices and the like, etc.). Thus, the wireless communication management system 100 affords substantial flexibility in the types of information that can be employed to manage wireless communications for a computing device. The wireless communication management system 100 can also be utilized to provide communication allocations 106 to other wireless communication management systems to facilitate them in providing their communication allocations.

The wireless communication management component 102 obtains the communication information 104 relating to at least one wireless device and reconciles the communication information 104 to allow operability of the wireless device with the computing device. This ensures that wireless devices connected to a computing device do not interfere with each other and/or do not operate on restricted frequencies. By centrally managing the wireless devices via the wireless communication management component 102, a computing device can track pertinent information relevant to providing interference-free and/or legal (unrestricted) wireless communications and/or alerting a user that interference/operability issues exist when and/or while wireless devices are "connected to" the computing device and/or as the computing device moves from place to place (i.e., physical location of the computing device changes). "Connected to" can include, but is not limited to, connection means such as, for example, physical connections (e.g., external interfaces such as, for example, USB (universal serial bus) cables, serial cables, and/or network cables and the like and/or internal hardware connection interfaces such as, for example, card bus interfaces, PCI (personal computer interface), etc.) and/or wireless connections (e.g., radio signal connections, optical signal connections, sound signal connections and the like). Thus, an instance can be utilized to provide location restrictive and/or interference free communications for/from a portable computing device such as, for example, a laptop with a built-in wireless networking device and a USB Bluetooth device that is plugged into a USB port on the laptop. The systems and methods herein are not limited by the communication standard itself. Wireless standards that are manageable by the wireless communication management system 100 include, but are not limited to, wireless USB, Bluetooth, WiFi/802.11, WiMedia, Ultra Wide Band (UWB), ZigBee, and/or WiMax and the like. One skilled in the art can appreciate that as technology advances new standards and/or communication means can develop and are within the scope of the systems and methods provided herein.

The wireless communication management component 102 performs the above by providing the communication allocations 106 that facilitate to manage wireless devices. The communication allocations 106 can include, but are not limited to, frequency spectrum allocations, frequency masks, power restrictions, range restrictions, and/or other allocations that provide interference management with other wireless devices and/or management of a wireless device based on physical location. Thus, for example, the wireless communication management system 100 employed in a mobile computing device can facilitate in providing compatible wireless communications for various wireless capabilities of the computing device and can also manage transmissions of wireless devices dynamically as the mobile computing device location changes. The wireless devices themselves can include, but are not limited to, wireless Ethernet cards, USB devices, infrared (IR) devices, cellular telephone devices, personal digital assistants (PDAs), and/or other devices capable of wireless communications.

In one instance, for example, an operating system can be created with an architecture that allows external sources to provide spectrum masks to work around defects. A small definition is typically needed in a controller interface layer to provide a spectrum mask in a standardized manner from an operating system. The spectrum mask itself can be relayed to a user via a standardized User Interface (UI) and/or via an application on top of the operating system.

For example, a traveler from the United States could take a Bluetooth enabled camera along with their laptop computer to France for a sight-seeing trip. Currently, France and the United States employ different Bluetooth frequency spectrum masks (France is a subset of the frequencies allowed in the United States). Thus, a camera designed for the United States market could be illegal to operate in France because it would transmit frequencies that are restricted in France. Some manufacturers attempt to alleviate this issue by either always restricting the frequency mask to the narrowest of market countries (however it cannot be guaranteed to work 100% in all countries) and/or by providing an awkward and burdensome user interface on the back of the camera for selecting what country a user is employing the camera in. Instances presented herein, however, can be employed to allow the camera to be automatically updated with a latest mask and/or location information to account for the geographic area that the wireless device (camera) is being utilized in. Thus, for example, when the camera is interfacing with the laptop computer, the computer can inform the user that the laptop is operating in a different region that requires the camera to be updated so that it can operate wirelessly within the guidelines for that region. The user can control the action and/or the action can be accomplished automatically. The laptop can then pass location information and/or an appropriate frequency mask to the camera, extending the usefulness of the camera.

Figure 2:
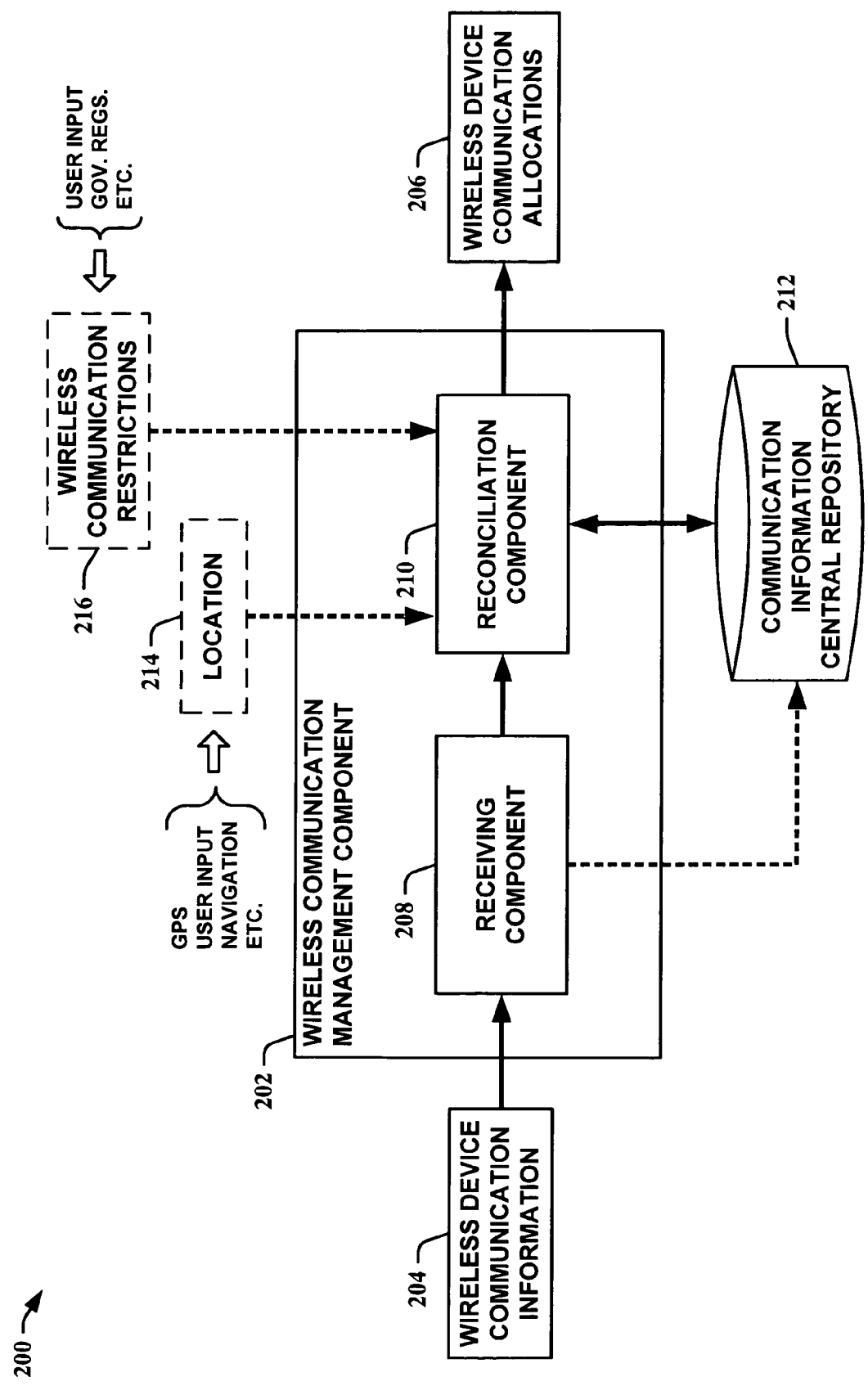
FIG. 2 is another block diagram of a wireless communication management system in accordance with an aspect of an embodiment.

Referring to FIG. 2, another block diagram of a wireless communication management system 200 in accordance with an aspect of an embodiment is depicted. The wireless communication management system 200 is comprised of a wireless communication management component 202 that receives wireless device communication information 204 and provides wireless device communication allocations 206. The wireless communication management component 202 is comprised of a receiving component 208 and a reconciliation component 210. The receiving component 208 obtains the wireless device communication information 204. The receiving component 208 can optionally (denoted by dashed lines in FIG. 2) directly store the wireless device communication information 204 in a communication information central repository 212 that is accessible by the reconciliation component 210. The reconciliation component 210 can then obtain the wireless device communication information 204 directly from the receiving component 208 and/or from the communication information central repository 212. The reconciliation component 210 can also store the wireless device communication information 204 in the communication information central repository 212. The communication information central repository 212 can be located locally and/or remotely to the wireless communication management system 200.

The reconciliation component 210 can reconcile a wireless communication device based on other wireless devices (e.g., information from the communication information central repository 212) and/or based upon a physical location. The reconciliation component 210 can accomplish this by optionally obtaining a location 214 and/or wireless communication restrictions 216 and the like. The wireless communication restrictions 216 can be obtained as a user input (e.g., police force restricting frequency usage, etc.) and/or obtained via a system input (e.g., preloaded based on political boundaries, etc.). Thus, the reconciliation component 210 can employ the wireless communication restrictions 216 based on the location 214. The location 214 can be provided by an internal means (e.g., dead reckoning, gyroscope, built-in GPS device, etc.) and/or an external means (e.g., user input, external location device, externally transmitted location information—direct (e.g., location service, etc.) and/or indirect (e.g., triangulation of cell towers, etc.)) and the like. Thus, the reconciliation component 210 provides the wireless device communication allocations 206 by employing the communication information central repository 212 and the wireless device communication information 204 and/or by optionally employing the location 214 (and its associated wireless communication restrictions 216). In this manner, wireless devices connected to a computing device can be centrally managed to avoid interference issues and/or location restrictions and the like.

Figure 3:
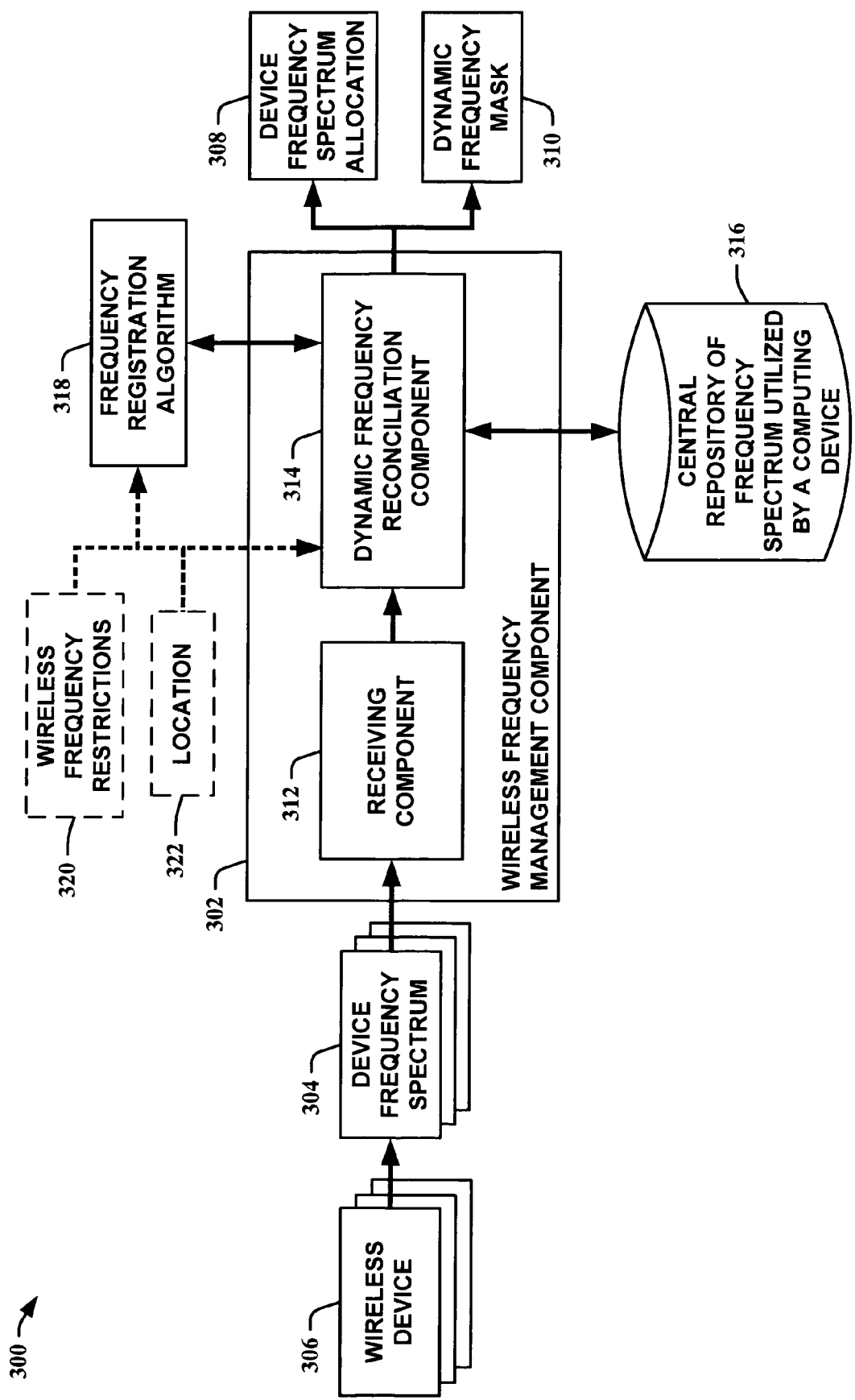
FIG. 3 is a block diagram of a wireless frequency management system in accordance with an aspect of an embodiment.

Looking at FIG. 3, a block diagram of a wireless frequency management system 300 in accordance with an aspect of an embodiment is illustrated. The wireless frequency management system 300 is comprised of a wireless frequency management component 302 that receives device frequency spectrum 304 from a wireless device 306 and provides a device frequency spectrum allocation 308 and/or a dynamic frequency mask 310. The wireless frequency management component 302 is comprised of a receiving component 312 and a dynamic frequency reconciliation component 314. The receiving component 312 obtains the device frequency spectrum 304. The dynamic frequency reconciliation component 314 receives the device frequency spectrum 304 from the receiving component 312. The dynamic frequency reconciliation component 314 reconciles the device frequency spectrum 304 with a central repository of frequency spectrum utilized by a computing device 316 via employment of a frequency registration algorithm 318. In this manner, the dynamic frequency reconciliation component 314 provides the device frequency spectrum allocation 308 and/or the dynamic frequency mask 310 for the wireless device 306. In another instance, the dynamic frequency reconciliation component 314 selects an appropriate dynamic frequency mask 310 from a predetermined list of frequency masks. Thus, if sets of masks are preprogrammed in a wireless device, the dynamic frequency reconciliation component 314 can set a mask identifier that notifies a wireless device of which mask to employ. Optionally, the dynamic frequency reconciliation component 314 can employ wireless frequency restrictions 320 and/or location 322. This information 320, 322 can also be directly utilized in formulating the frequency registration algorithm 318. By dynamically reconciling a wireless device, the dynamic frequency reconciliation component 314 provides a means to allow 'plug-and-play' (hot plugging) of wireless devices while ensuring that the devices operate on a non-interference basis. When location 322 is employed, the dynamic frequency reconciliation component 314 can dynamically manage the wireless device 306 as the location 322 changes, extending the usefulness of the wireless device 306.

Typically, there are a few key problems that arise with the use of wireless buses. Frequency Spectrum Overlap between multiple buses—In the world of wired buses, IO ranges, interrupts, etc. are finite in a computing device and need to be distributed. This process of sharing system resources among devices so that they can all function well is referred to as plug-n-play (PNP) system re-balancing. With wireless buses, frequency ranges need to be used by multiple buses. There are cases when an 802.11b radio will need to use a small frequency spectrum in the 2.4 GHz range and so would a Bluetooth radio. When both devices use the same frequency spectrum, they would interfere with each other, greatly reducing the overall throughput.

Frequency Spectrum Masking—Different governments around the world frequently offer different ranges in a frequency band for a given technology. For example, Bluetooth generally uses the frequency range of 2.41-2.47 GHz. However, some countries restrict the Bluetooth range to the 2.45-2.46 GHz range while other countries do not have this restriction. Manufacturers of devices being sold in the former countries have to create special versions of devices to cater to those countries' needs. This not only makes the manufacturing process more expensive, but also reduces the options of purchasing devices of interest in foreign countries.

Frequency spectrum masking can also be employed by a radio manufacturer to work around defects in the radio antenna and/or design to limit the radio to function in its optimal range. This can be achieved currently by programming a mask in the radio MAC itself (which is generally much harder to do). In some cases, government (e.g., police) and/or military bodies need to apply special masks to limit their interference or possibility of intrusion to their radios. Instances of the systems and methods herein can allow such a body to create a private mask that is compliant with a standard and a radio design and provide it to the hardware through, for example, operating system defined data structures. Some instances of the systems and methods provided herein can be accomplished by utilizing extensions to host controller interfaces (HCIs) to allow operating systems to provide frequency masking information in a standardized way to local and/or remote radios that are compliant with the HCI. In other instances, an operating system dependant extension can be created.

In view of the exemplary systems shown and described above, methodologies that may be implemented in accordance with the embodiments will be better appreciated with reference to the flow charts of FIGS. 4-7. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 4:
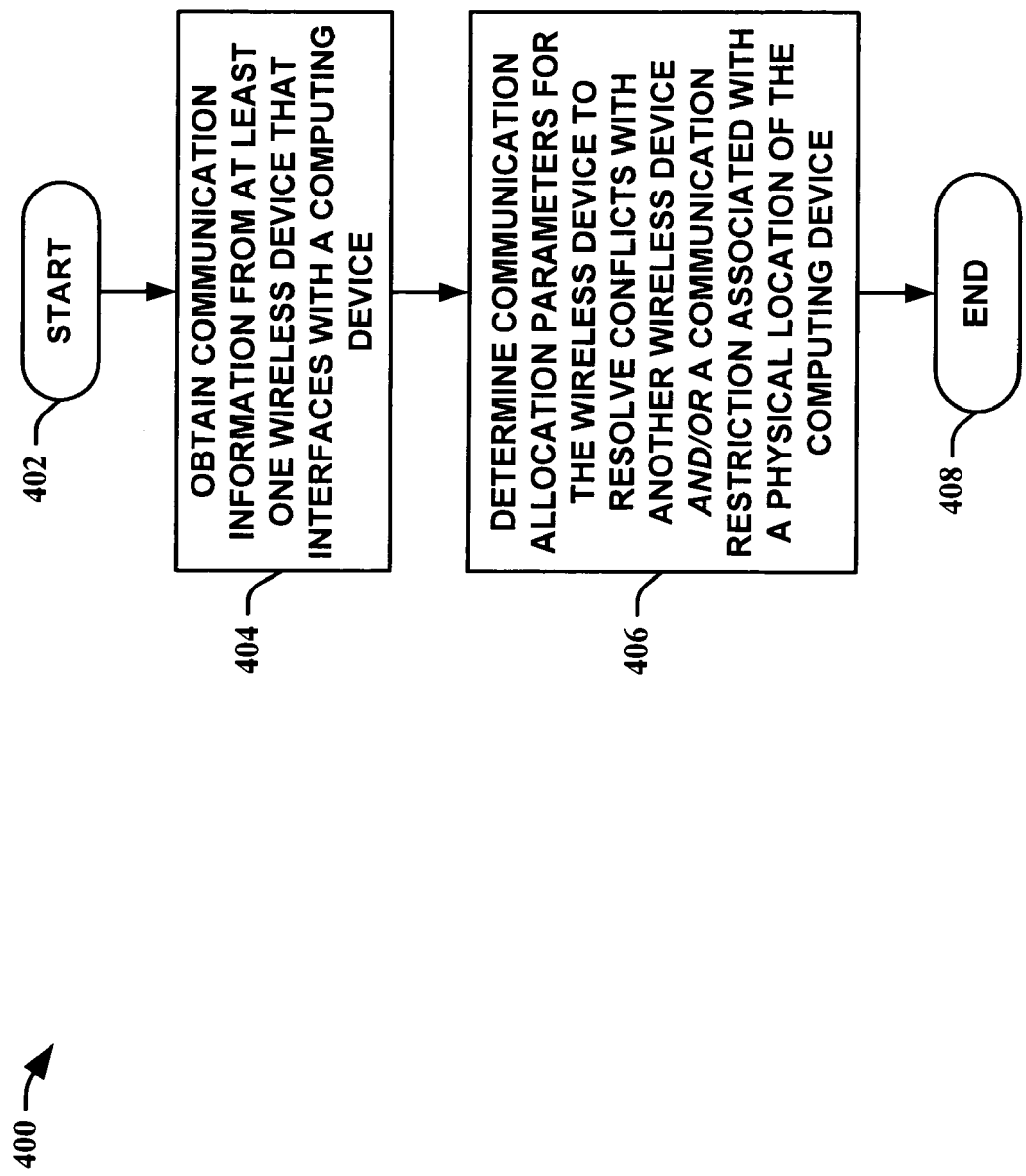
FIG. 4 is a flow diagram of a method of facilitating wireless communications in accordance with an aspect of an embodiment.

In FIG. 4, a flow diagram of a method 400 of facilitating wireless communications in accordance with an aspect of an embodiment is shown. The method 400 starts 402 by obtaining communication information from at least one wireless device that interfaces with a computing device 404. "Interfacing" includes, but is not limited to, direct physical interfaces and wireless interfaces and the like. The communication information can include, but is not limited to, supported wireless properties and/or current wireless properties such as, for example, hardware frequency spectrum, operating frequency masks, current frequency masks, power, range, band groups, channels, frequency usage type, and/or interference properties and the like. Geographic location can also be part of the communication information if a wireless device possesses this information (e.g., equipped with GPS, stationary wireless devices such as communication towers with operability with computing devices and the like, etc.).

Communication allocation parameters are then determined for the wireless device to resolve conflicts with another wireless device and/or a communication restriction associated with a physical location of the computing device 406, ending the flow 408. The communication allocation parameters can include, but are not limited to, allocations based on the various types of communication information. Thus, allocations (e.g., restrictions) can be provided for, for example, frequency spectrum, power, channels, range, and/or frequency masks and the like. This facilitates in providing non-interfering wireless communications that are dynamically adaptable based on location as well.

Figure 5:
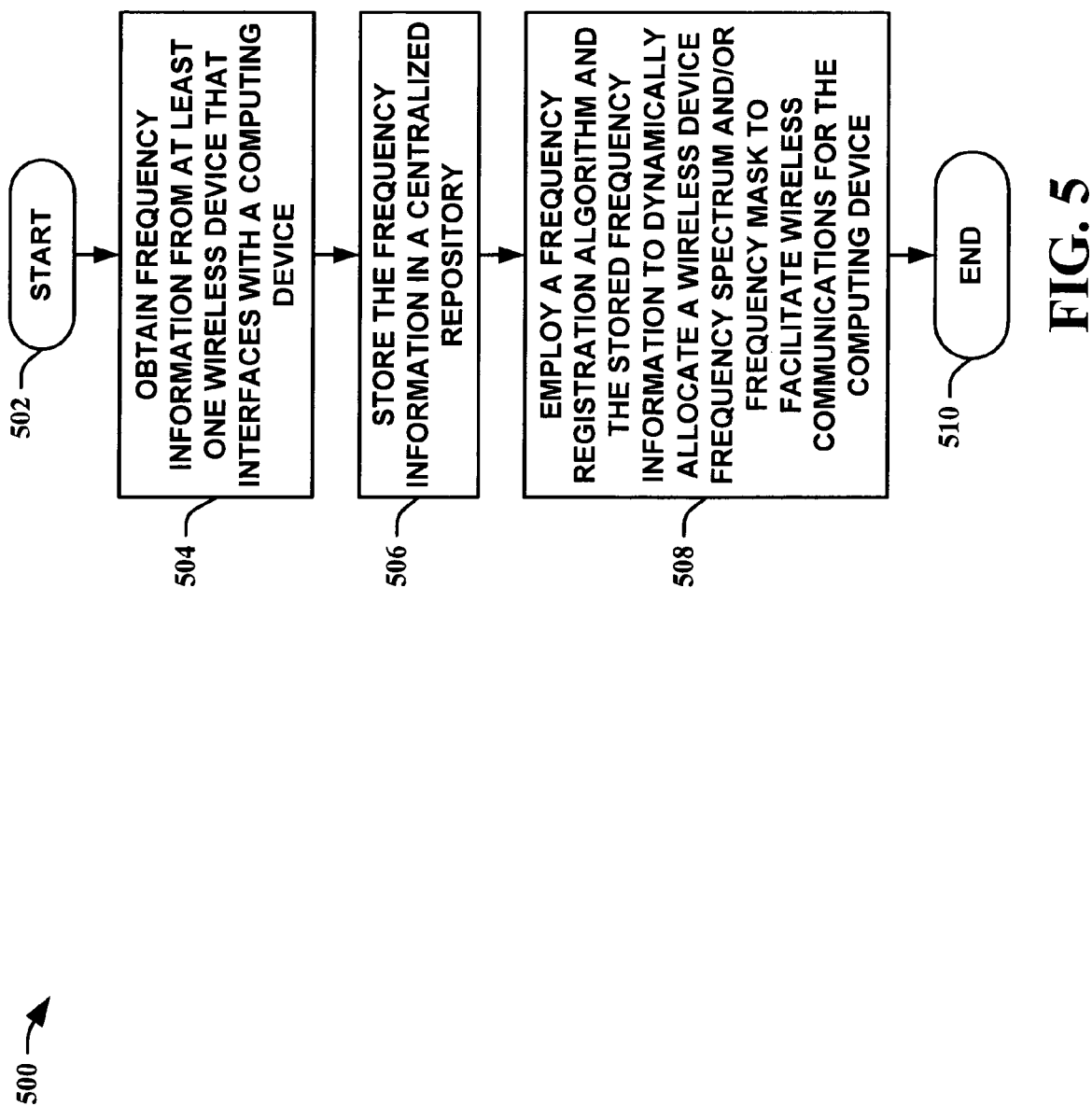
FIG. 5 is another flow diagram of a method of facilitating wireless communications in accordance with an aspect of an embodiment.

Looking at FIG. 5, another flow diagram of a method 500 of facilitating wireless communications in accordance with an aspect of an embodiment is illustrated. The method 500 starts 502 by obtaining frequency information from at least one wireless device that interfaces with a computing device 504. The frequency information can include, for example, hardware frequency spectrum, current operating masks, detected interferences, power, range, channels, and/or style of communication (e.g., frequency hopping, etc.) and the like. The frequency information is then stored in a centralized repository 506. The centralized repository can be local and/or remote to a computing device. Thus, for example, the data can be uploaded via the Internet to a database at a remote location, and/or it can be stored on a local hard drive and the like. A frequency registration algorithm and the stored frequency information are then employed to dynamically allocate a wireless device frequency spectrum and/or frequency mask to facilitate wireless communications for the computing device 508, ending the flow 510. The frequency registration algorithm is utilized to provide interference free wireless communications and/or location dependent communications for wireless devices interfacing with a computing device. Thus, the algorithm can incorporate location along with location wireless communication restrictions to facilitate in providing wireless frequency spectrum and/or frequency mask allocations and the like.

Figure 6:
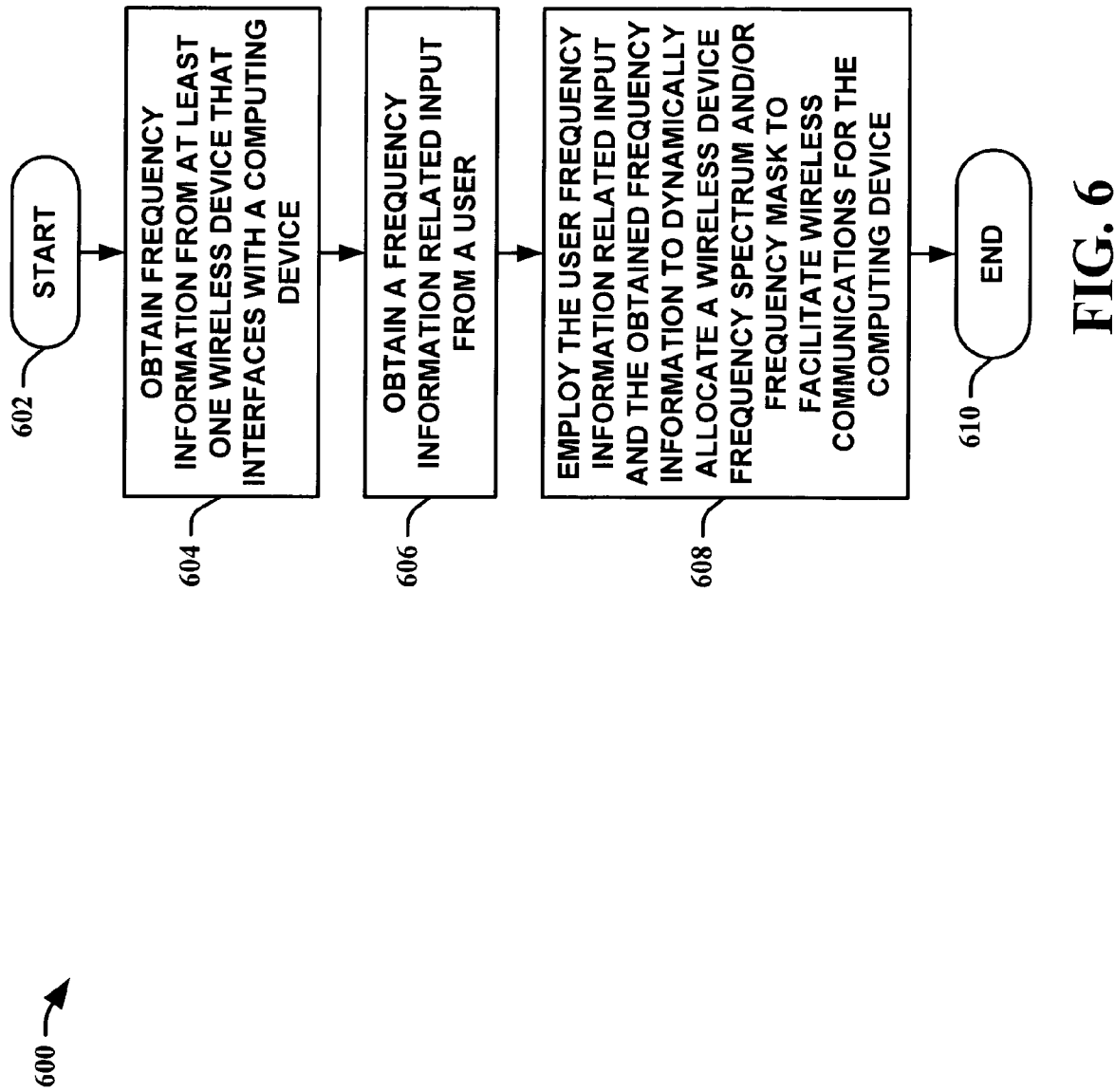
FIG. 6 is a flow diagram of a method of facilitating wireless communications via utilization of a user input in accordance with an aspect of an embodiment.

Turning to FIG. 6, a flow diagram of a method 600 of facilitating wireless communications via utilization of a user input in accordance with an aspect of an embodiment is depicted. The method 600 starts 602 by obtaining frequency information from at least one wireless device that interfaces with a computing device 604. A frequency information related input is then obtained from a user 606. The user input can be a location and/or wireless communication restriction information and the like. Thus, for example, the user can inform the computing device that it is now in a different country and to utilize its communication restrictions for that country. The user can also input restrictions directly. This can be useful when the computing device is not aware of the restrictions and/or when the user requires that communication frequencies be restricted for privacy concerns and the like. The user frequency information related input and the obtained frequency information are employed to dynamically allocate a wireless device frequency spectrum and/or frequency mask to facilitate wireless communications for the computing device 608, ending the flow 610.

Figure 7:
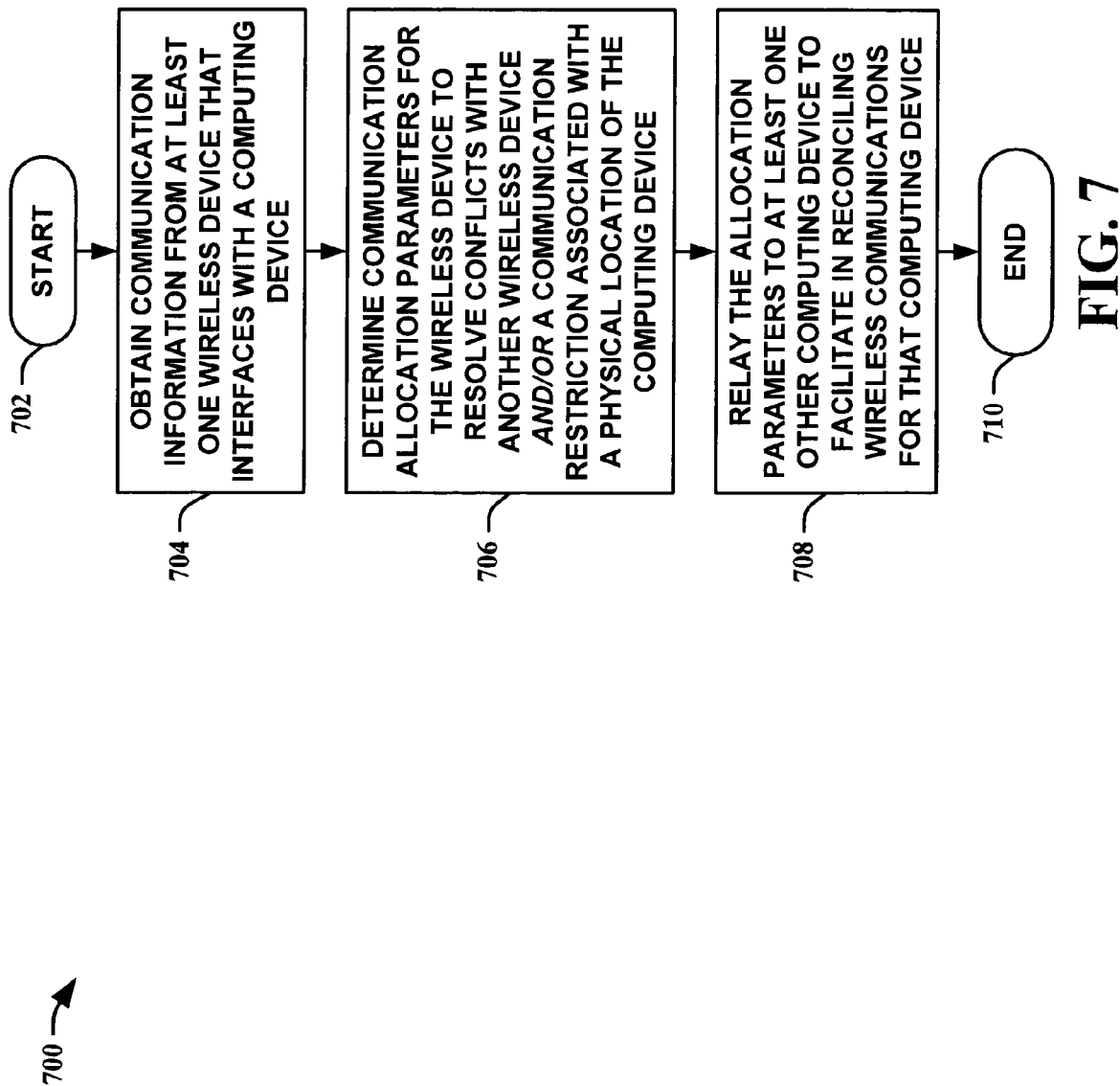
FIG. 7 is a flow diagram of a method of facilitating wireless communications via relaying information to other computing devices in accordance with an aspect of an embodiment.

Moving on to FIG. 7, a flow diagram of a method 700 of facilitating wireless communications via relaying information to other computing devices in accordance with an aspect of an embodiment is shown. The method 700 starts 702 by obtaining communication information from at least one wireless device that interfaces with a computing device 704. Communication allocation parameters are then determined for the wireless device to resolve conflicts with another wireless device and/or a communication restriction associated with a physical location of the computing device 706. The allocation parameters are relayed to at least one other computing device to facilitate in reconciling wireless communications for that computing device 708, ending the flow 710. Thus, for example, if interferences and/or other known restrictions are utilized to determine allocations for a wireless device, this information can be employed by other computing devices to facilitate in their wireless device reconciliations. For example, if a particular suite of wireless devices are utilized with a particular model of computing device in a given country, the allocation parameters can be forwarded to another computing device so that it is compatible immediately upon arrival in the given country. As another example, if a hardware defect is known in a particular wireless device, a mask that resolves issues with the defect can be relayed to other computing devices to prevent problems from arising before they occur.

In yet another example, a wireless device could employ frequency hopping techniques with a substantial amount of interference at one frequency. It is possible that the wireless device might not be able to detect the anomaly at the frequency granularity (despite knowing that packets of information are not getting communicated, etc.). However, another wireless device employing different wireless technology might be able to pinpoint which frequency has interference. This information can then be relayed to another computing device (and/or even just within a single computing device) to the wireless device with the interference issue and/or to a centralized wireless manager to reconcile the interference issue.

Figure 8:
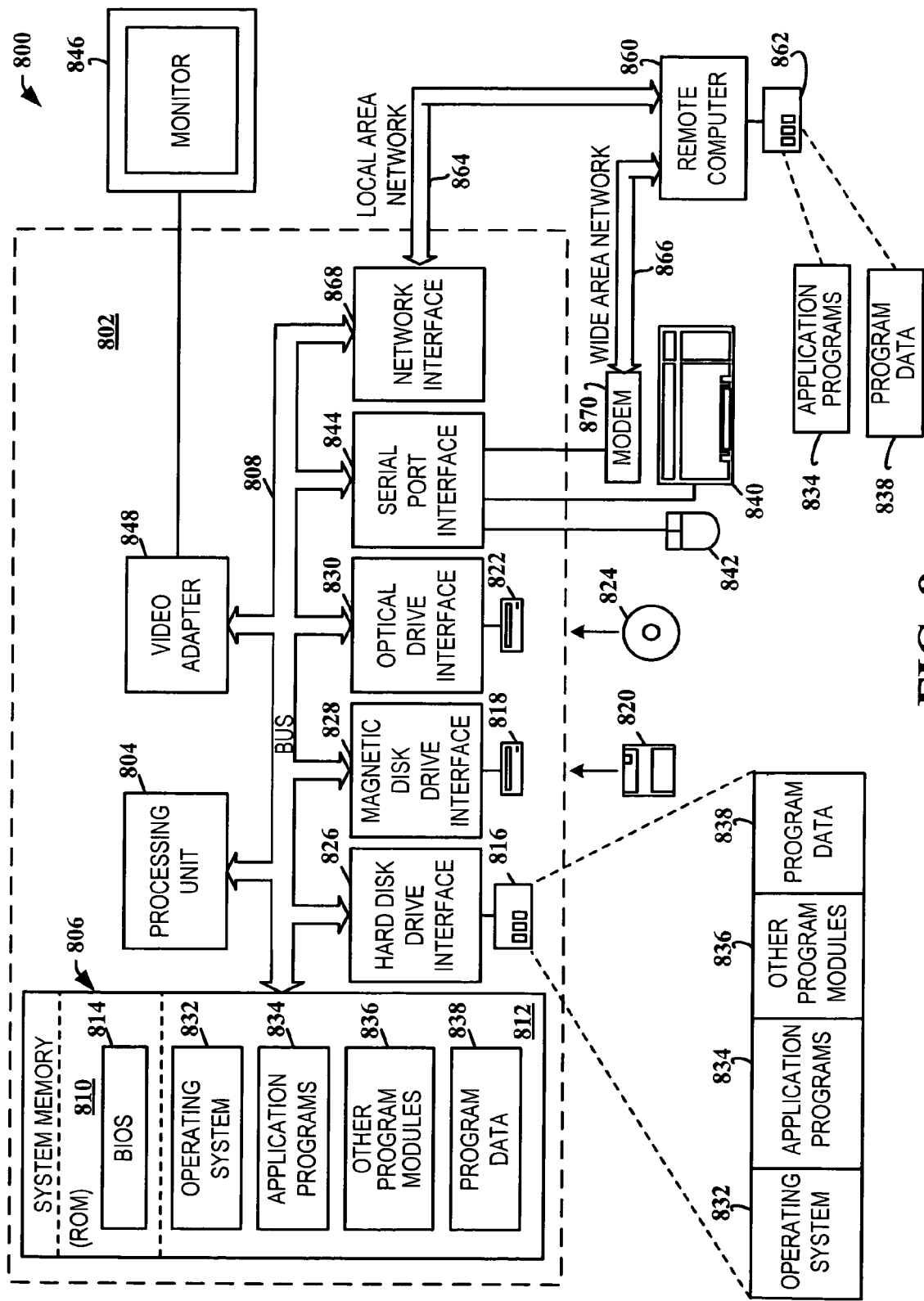
FIG. 8 illustrates an example operating environment in which an embodiment can function.

In order to provide additional context for implementing various aspects of the embodiments, FIG. 8 and the following discussion is intended to provide a brief, general description of a suitable computing environment 800 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 8, an exemplary system environment 800 for implementing the various aspects of the embodiments include a conventional computer 802, including a processing unit 804, a system memory 806, and a system bus 808 that couples various system components, including the system memory, to the processing unit 804. The processing unit 804 may be any commercially available or proprietary processor. In addition, the processing unit may be implemented as multi-processor formed of more than one processor, such as may be connected in parallel.

The system bus 808 may be any of several types of bus structure including a memory bus or memory controller, a peripheral bus, and a local bus using any of a variety of conventional bus architectures such as PCI, VESA, Microchannel, ISA, and EISA, to name a few. The system memory 806 includes read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also may include, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media may contain computer-executable instructions for performing the methods of the embodiments.

A number of program modules may be stored in the drives 816-822 and RAM 812, including an operating system 832, one or more application programs 834, other program modules 836, and program data 838. The operating system 832 may be any suitable operating system or combination of operating systems. By way of example, the application programs 834 and program modules 836 can include a wireless communication scheme in accordance with an aspect of an embodiment.

A user can enter commands and information into the computer 802 through one or more user input devices, such as a keyboard 840 and a pointing device (e.g., a mouse 842). Other input devices (not shown) may include a microphone, a joystick, a game pad, a satellite dish, a wireless remote, a scanner, or the like. These and other input devices are often connected to the processing unit 804 through a serial port interface 844 that is coupled to the system bus 808, but may be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 may include other peripheral output devices (not shown), such as speakers, printers, etc.

It is to be appreciated that the computer 802 can operate in a networked environment using logical connections to one or more remote computers 860. The remote computer 860 may be a workstation, a server computer, a router, a peer device or other common network node, and typically includes many or all of the elements described relative to the computer 802, although for purposes of brevity, only a memory storage device 862 is illustrated in FIG. 8. The logical connections depicted in FIG. 8 can include a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically includes a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of an embodiment.

In accordance with the practices of persons skilled in the art of computer programming, the embodiments have been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations include the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

Figure 9:
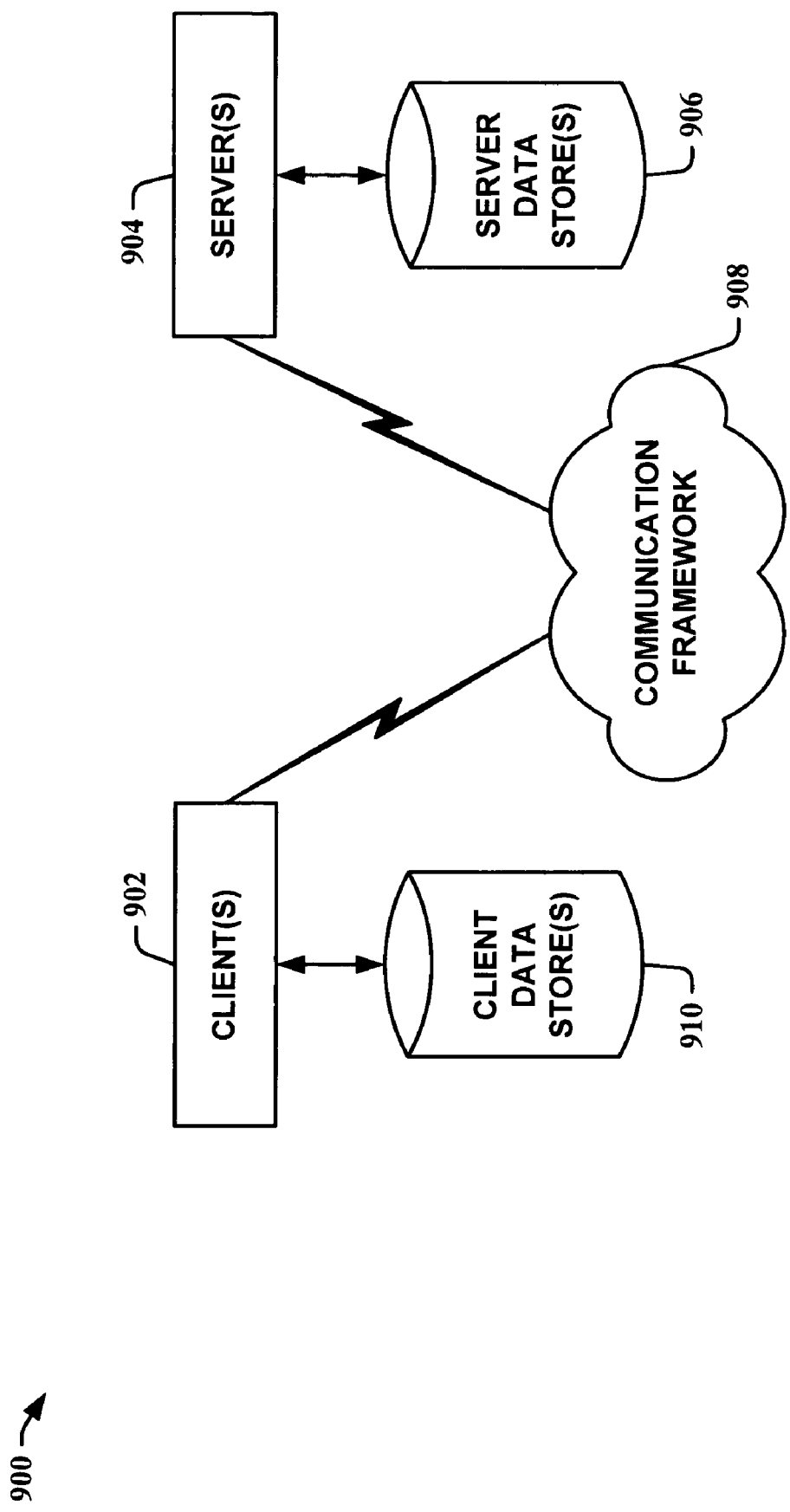
FIG. 9 illustrates another example operating environment in which an embodiment can function.

FIG. 9 is another block diagram of a sample computing environment 900 with which embodiments can interact. The system 900 further illustrates a system that includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). One possible communication between a client 902 and a server 904 may be in the form of a data packet adapted to be transmitted between two or more computer processes. The system 900 includes a communication framework 908 that can be employed to facilitate communications between the client(s) 902 and the server(s) 904. The client(s) 902 are connected to one or more client data store(s) 910 that can be employed to store information local to the client(s) 902. Similarly, the server(s) 904 are connected to one or more server data store(s) 906 that can be employed to store information local to the server(s) 904.

It is to be appreciated that the systems and/or methods of the embodiments can be utilized in wireless communication facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile computing device that facilitates wireless communications, comprising:
  a receiving component that obtains wireless device communication information comprising information relating to at least one operating frequency spectrum for at least one wireless device from the at least one wireless device through communications with the at least one wireless device; and
  a reconciliation component that:
    accesses available communication information defining governmental frequency spectrum transmission restrictions,
    selects at least one operating frequency for the at least one wireless device from the wireless device communication information based on the available communication information, and a geographic location of the mobile computing device, and
    sends the at least one operating frequency for the at least one wireless device to the at least one wireless device, wherein the reconciliation component prevents the wireless device from transmitting on frequencies outside of the governmental frequency spectrum transmission restrictions for the geographic location.

2. The mobile computing device of claim 1, the information relating to the at least one operating frequency spectrum comprising, at least in part, frequency mask information, range information, power information, channel information, frequency usage type information, or interference property information.

3. The mobile computing device of claim 1, the reconciliation component dynamically reconciles the device operating frequency spectrum information with available frequency spectrum related information from the computing device.

4. The mobile computing device of claim 3, the reconciliation component utilizes at least one frequency mask to facilitate in reconciling the device operating frequency spectrum information with the available frequency spectrum related information; the frequency mask obtained by the receiving component from at least one wireless device.

5. The mobile computing device of claim 4, the receiving component obtains the frequency mask in real-time from the wireless device.

6. The mobile computing device of claim 1, the reconciliation component utilizes the reconciliation to select a dynamic frequency mask to facilitate utilization of the wireless device by the computing device.

7. The mobile computing device of claim 1, the reconciliation component reconciliation is based, at least in part, on identifying overlap between frequency usage for two or more wireless communication standards within the geographic location based on the available communication information, wherein the wireless device is operating on one of the wireless communication standards, the reconciliation component provides the wireless device with frequency allocation information to prevent operating on the overlapping frequencies.

8. The mobile computing device of claim 1, the communication information comprising at least one of supported or current radio properties of a wireless device.

9. The mobile computing device of claim 1, wherein the at least one wireless device communicates with the mobile computing device using a plug-and-play technology.

10. A method for facilitating wireless communications between a mobile computing device and a wireless device, the method comprising:
    obtaining, at the mobile computing device, wireless device communication information from the wireless device that interfaces with the mobile computing device, through communications with the wireless device;
    determining a geographical location of the mobile computing device;
    obtaining, at the mobile computing device, communication information comprising a governmental wireless frequency spectrum transmission restriction applicable for communication of the wireless device with at least the mobile computing device at the geographical location;
    determining, at the mobile computing device, frequency transmission parameters for the wireless device to enforce the governmental wireless frequency spectrum transmission restriction, from the wireless device communication information, based on the governmental wireless frequency spectrum transmission restriction and the geographical location of the mobile computing device; and
    communicating, by the mobile computing device, to the wireless device the determined frequency transmission parameters, whereby the wireless device is restricted from transmitting on frequencies that violate the governmental wireless frequency spectrum transmission restriction.

11. The method of claim 10, the communication information comprising, at least in part, current interference properties associated with the wireless device.

12. The method of claim 10 further comprising:
    resolving conflicts relating to the geographical location based, at least in part, on governmental frequency transmission regulations for wireless devices operating in a particular region.

13. The method of claim 10 further comprising:
    dynamically determining acceptable communication parameters to facilitate in associating wireless devices to the computing device.

14. The method of claim 10 further comprising:
    controlling wireless device communications to prevent interference with another wireless device that interacts with the mobile computing device.

15. The method of claim 10 further comprising:
    relaying of the acceptable communication parameters from the mobile computing device to another computing device.

16. The method of claim 10 further comprising:
    depositing communication information in a central repository; and
    centrally managing communication aspects of the wireless device that interacts with the mobile computing device.

17. The method of claim 10 further comprising:
    providing a frequency mask to the wireless device that restricts the operating frequency of the wireless device to comply with the governmental wireless frequency spectrum transmission restriction.

18. A device employing the method of claim 10 comprising at least one selected from the group consisting of a computer, a server, and a handheld electronic device.

19. The method of claim 10, wherein obtaining the communication information comprising the governmental wireless frequency spectrum transmission restriction comprises obtaining the communication information from a device external to the wireless device and the mobile computing device.

20. A system comprising at least a wireless device communicating with a mobile computing device that facilitates wireless communications, the system comprising:
    means for obtaining, at the mobile computing device, wireless device communication information from at least one wireless device, wherein the communication information comprises operating frequencies that are supported by the wireless device;
    means for reconciling, at the mobile computing device, the wireless device communication information with available communication information for the mobile computing device with which the wireless device is communicating, wherein the means for reconciling:
        obtains governmental restrictions on transmission frequencies for a geographic region in which the mobile computing device and the wireless device are currently located, wherein the available communication information includes the governmental restrictions on transmission frequencies,
        identifies, from the wireless device communication information, frequencies on which the wireless device can operate that do not violate the governmental restrictions on transmission frequencies, based on the governmental restrictions on transmission frequencies for the geographic region, and
        communicates to the wireless device allocation information including the identified frequencies on which the wireless device can operate; and
    means for preventing the wireless device from transmitting on transmission frequencies outside of the identified frequencies on which the wireless device can operate that do not violate the governmental restrictions on transmission frequencies for the geographic region.

* * * * *